Feb. 11, 1969 K. BAUER 3,426,513
VEHICULAR VORTEX CYCLONE TYPE AIR AND GAS PURIFYING DEVICE
Original Filed March 26, 1965 Sheet 1 of 5
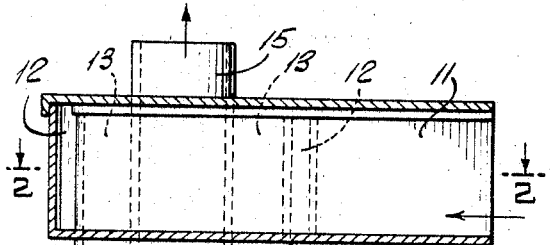
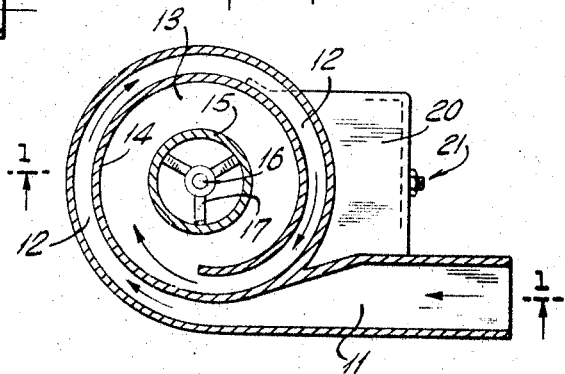
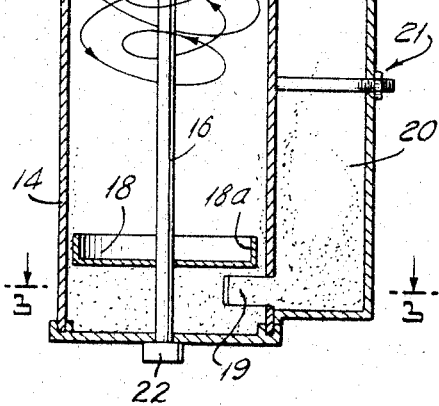
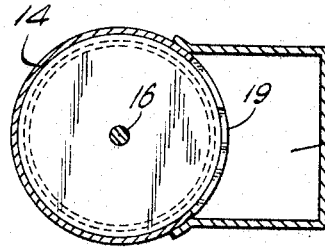
INVENTOR
KURT BAUER

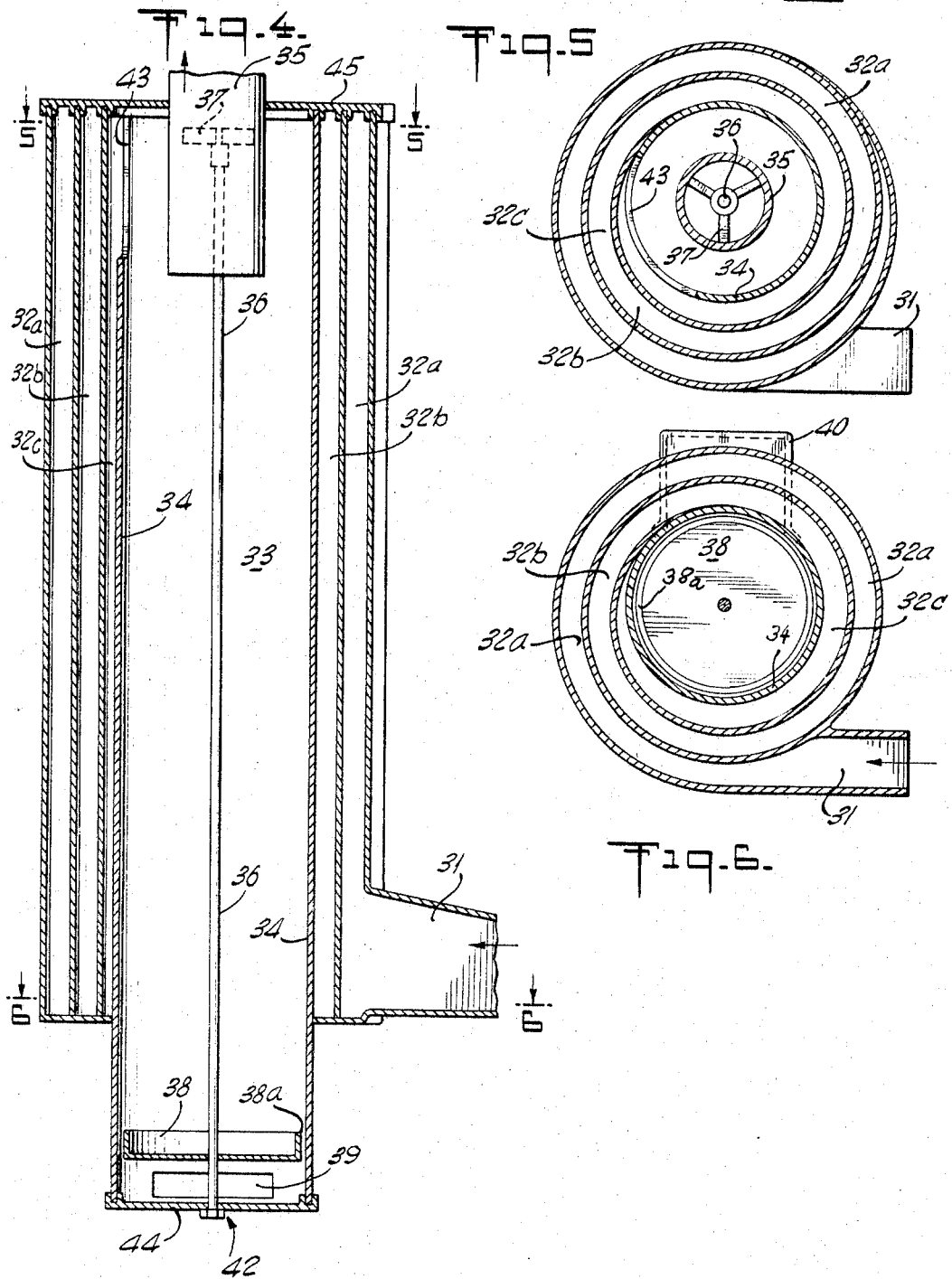

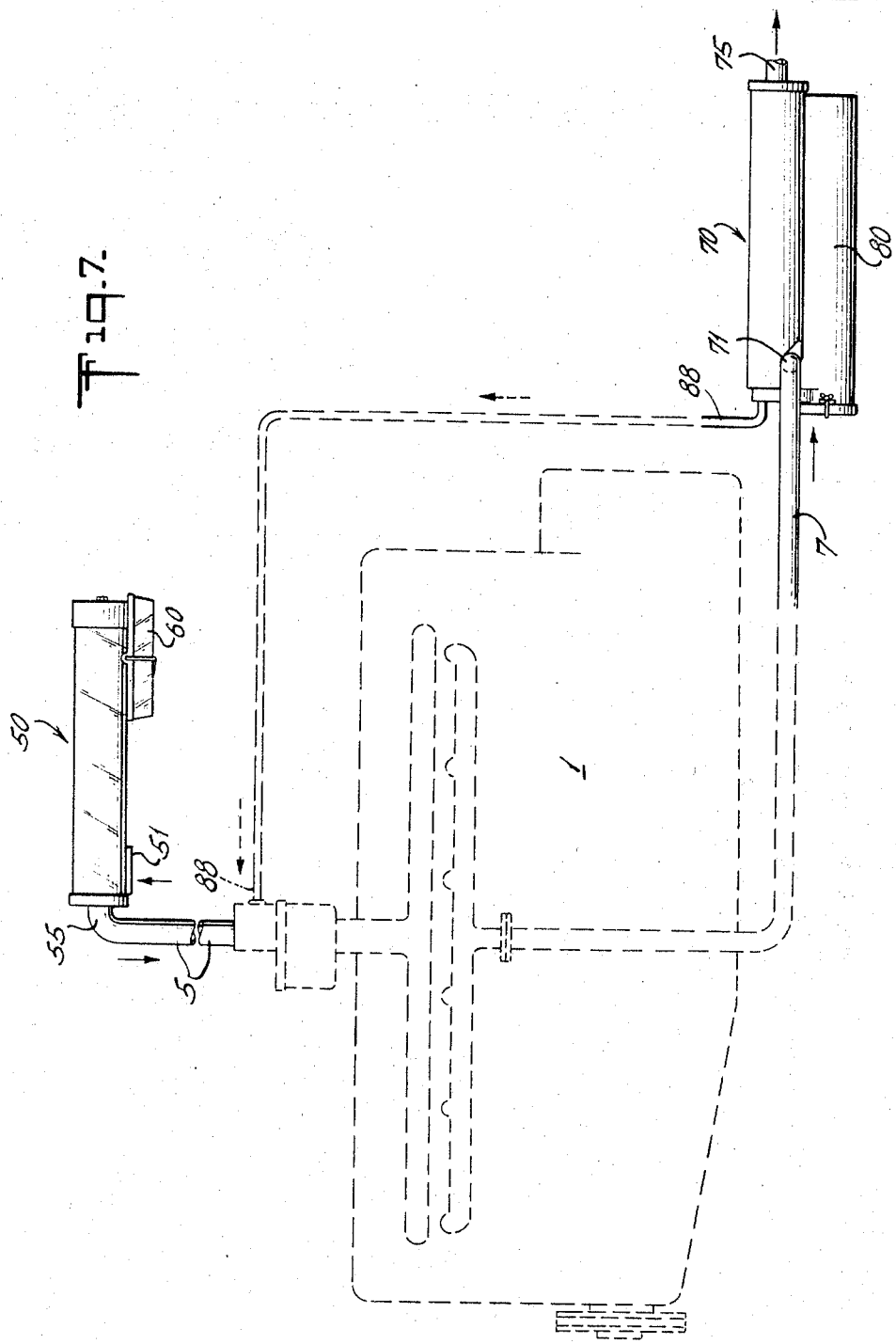

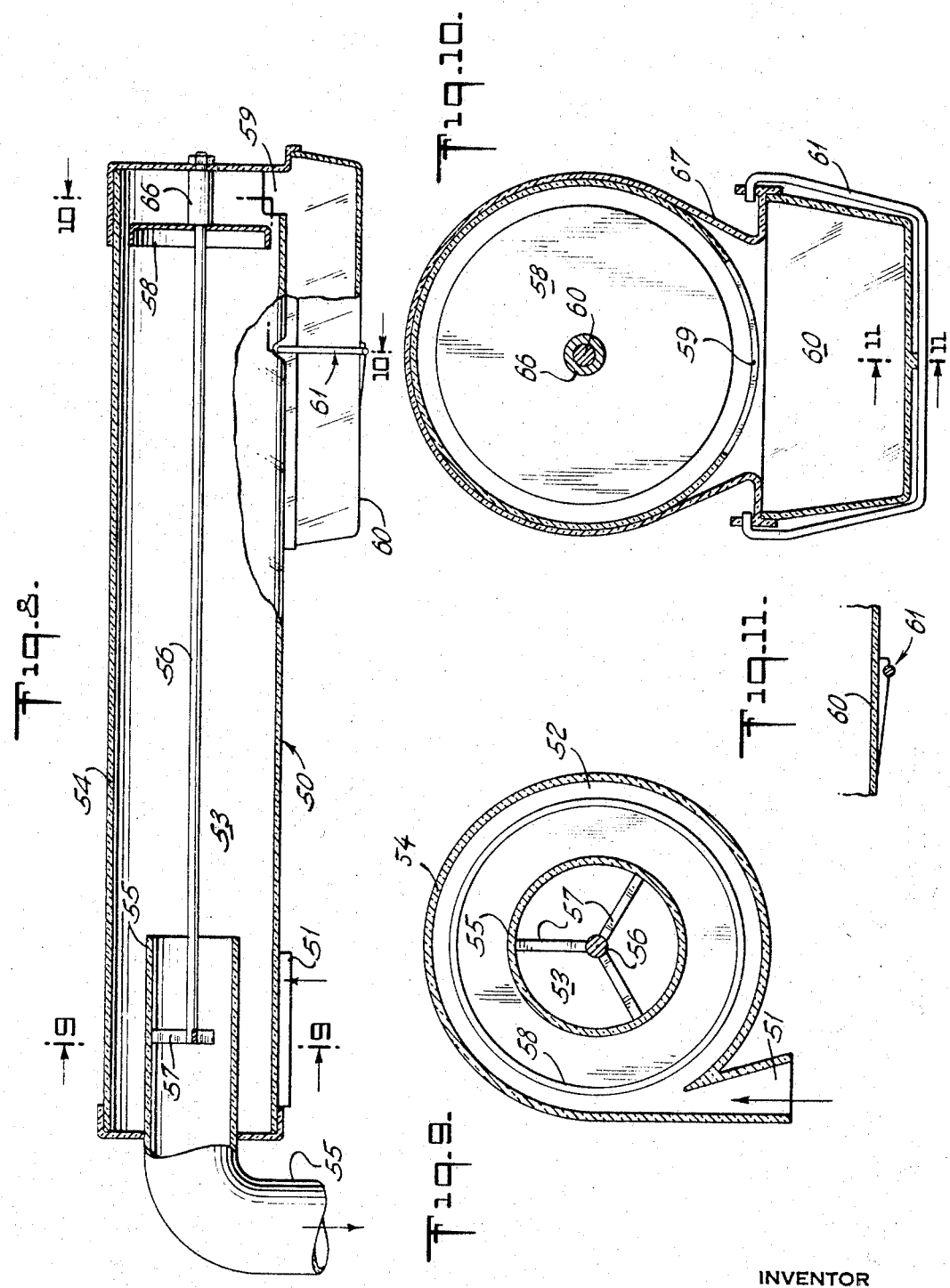

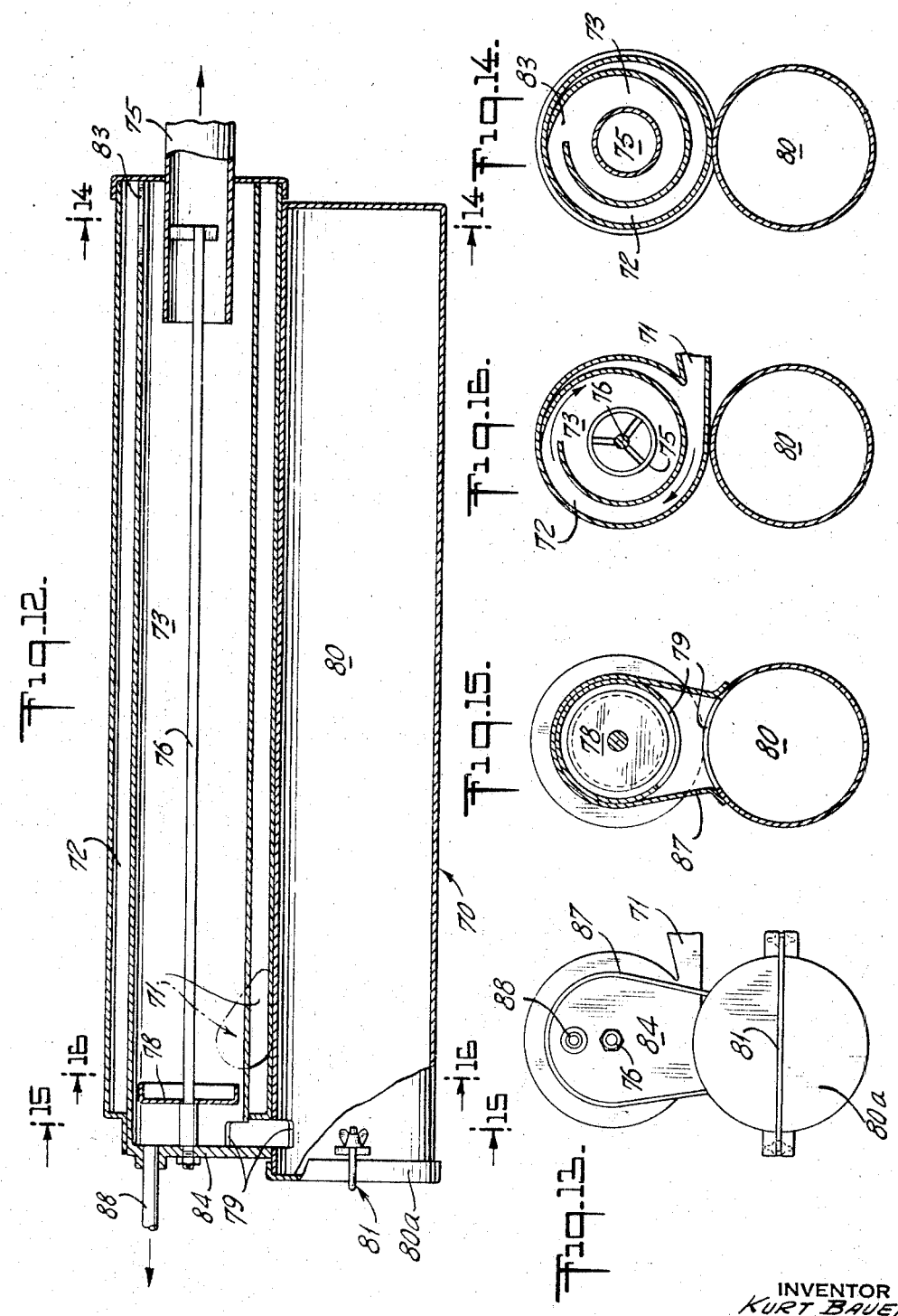

United States Patent Office 3,426,513
Patented Feb. 11, 1969

3,426,513
VEHICULAR VORTEX CYCLONE TYPE AIR AND GAS PURIFYING DEVICE
Kurt Bauer, Merkwitz-Leipzig, Germany, assignor of fifty percent to Albert C. Nolte, Jr., New York, N.Y.
Continuation of application Ser. No. 443,038, Mar. 26, 1965. This application Nov. 13, 1967, Ser. No. 683,103
U.S. Cl. 55—459
Int. Cl. B04c 5/04
6 Claims

ABSTRACT OF THE DISCLOSURE

A vortex-type fluid purifying device has a cylindrical chamber, a helical inlet conduit laterally opening into said chamber at its top portion, a tubular outlet concentrically protruding through the top end and partially extending within said chamber, a disc-shaped member disposed at the bottom portion and in spaced relation therewith, and a dust collector housing the outlet of which is in communication with said chamber between the disc-shaped member and the bottom end.

---

This application is a continuation of application Ser. No. 443,038, filed Mar. 26, 1965, now abandoned.

The present invention relates to vortex cyclone type air and gas purifying devices, and more particularly to such devices adapted for vehicular applications.

The cleaning or purification of air and gas from dust particles and other impurities is an important economic task which becomes more and more important as technology advances, bringing about an ever-increasing number of gasoline and diesel engines, industrial plants, etc. Locomotives are also potential sources of impurities that are added to the atmosphere.

Various dust collectors, air cleaners, gas purifiers, Vortex separators, exhaust cleaners, dust cyclones and the like became known which are based on various principles. In most structures the chamber or duct wherein the air is made to whirl around tapers toward its bottom. By this arrangement, the stream of whirling air or gas is very near to the discharged, supposedly cleaned core current; the result is that substantial amounts of small particles are entrained in the discharged air or gas. It has been found that one of the major reasons for the core current and the surrounding whirling stream becoming intermixed is that the former is subject to lateral oscillations or wavering, so that the contiguous regions intersect.

Air cleaners became known in which a central bolt or axial member is provided which may tend to stabilize one of the air or gas currents. However, the designers failed to recognize that particular proportions have to be observed if such a stabilizing function be achieved with optimum efficiency. The preferably tangential introduction of the air to be purified, the length of the whirling column are all important factors which have not been correlated so far in a manner to produce an effective vortex cyclone type purifier for vehicular purposes.

It is the object of the present invention to provide purifying devices of the described kind, primarily for the use in or with internal-combustion engines, which avoid the drawbacks of hitherto used devices, are simple in structure, foolproof in operation, and can optionally be used for filtering the incoming air and the exhaust gases.

It is also an object of the invention to provide such devices which lend themselves not only for pre-filtering or preliminary cleaning of air or gas in industrial, chemical or vehicular applications, but which allow minute particles to be separated or precipitated, the lower region of such particles being in the neighborhood of .25µ to 10µ. This was not possible with known vortex separators or cyclones which, therefore, could be used as coarse precipitators only, or in conjunction with subsequent stages of other means, e.g., electrostatic or other costly arrangements.

It is also the object of the invention to provide a vortex cyclone type purifying device the proportions and physical dimensions of which are highly conducive to approximately 100% dust and particle separation.

It is further an object of the invention to provide a device which adapts itself, without drawbacks, to the ever changing conditions encountered with combustion engines, particularly with vehicles. Industrial type air and gas purifiers could, so far, not be used for vehicular purposes because a predetermined optimum air or gas speed had to be maintained so as to keep the device in operation. At speeds lower or higher than the optimum, unsatisfactory particle removal has been experienced. This will be obviated by the inventive device the performance of which is substantially uniform within a wide range of air or gas speeds.

It is yet another object of the invention to provide a dust separator wherein deposits of soot or accumulations of crust-like impurities are avoided by a judicious provision of a dust collecting chamber.

It is still another object to provide a separator which lends itself equally well for horizontal and vertical operation, also in moving vehicles, without disturbing the removal of small-size dust and impurities from the air or gas. The inventive device will operate at relatively low and varying pressures and velocities of flow. Horizontal application is made possible only by the provision of the inventive axial member, as will be described in more detail somewhat later.

According to one of the important features of the invention, the length of the vortex cyclone type air and gas purifier is at least threefold the diameter, allowing a sufficient length of a whirling air or gas column to develop. The slowly settling fine particles are thus given a chance to be deposited in the terminal regions of the annular inner space.

For stabilizing the whirling air column, an axial member is provided all along the inner space, whereby the annular, whirling stream of air or gas is prevented from being intermixed with the cleaned core current flowing in the opposite direction.

It is another feature that the air or gas inlet is tangential so as to impart a relatively high velocity to the fluid to be purified, while the air or gas outlet is coaxial with the annular space of the device. The dust particles are accumulated at the end of the device opposite the combined inlet and outlet openings. In preferred embodiments, a separate dust collector is attached, thereby increasing the performance of the device between cleaning and inspection.

Yet another feature of the invention relates to the provision of a disc- or cup-shaped member near the end of the tubular whirling space, with the edge of the cup directed toward the whirling air or gas column. Owing to this arrangement, most of the air movement is arrested by this member so that dust collection at the end of the tubular space, or across a lateral opening and into a dust collector, is not disturbed or impaired in any way.

In a modified embodiment of the device, the air inlet is removed from the outlet, an additional annular jacket being provided around the tubular whirling space proper. This arrangement almost redoubles the passage of the air through the device, making for a more thorough removal of entrained particles.

Yet another important feature of a specialized, modified embodiment, particularly suitable for exhaust gas purification, resides in allowing carbon oxide and/or monoxide to be returned to the air inlet of the engine, by providing an auxiliary, smaller outlet in the region of the dust collecting outlet. Preferably, this expedient is coupled with the previously described feature of an annular pre-whirling jacket, so that the air inlet is at the same end of the device as the said auxiliary outlet, while the purified air or combustion gases are discharged at the opposite end.

For heavily dust-laden air or gas currents, more than one purifying device may be provided in a group arrangement, particularly if the flow velocity is low. The cyclone type devices may discharge the separated particles in the same collecting bin around which they are arranged.

Other objects and advantages of the invention will be appreciated and more fully understood with reference to the following detailed description, when considered with the accompanying drawings, wherein FIG. 1 is a cross-sectional view of a first, preferred embodiment of the vortex cyclone type purifying device according to the invention, corresponding to a section taken along line 1—1 of FIG. 2;

FIG. 2 is a horizontal sectional view, along line 2—2 of FIG. 1, of the inlet portion of the device;

FIG. 3 is another horizontal sectional view, taken along line 3—3 of FIG. 1, of the dust-discharging portion of the device;

FIG. 4 is a view similar to that of FIG. 1 and shows a second, modified embodiment according to the invention;

FIG. 5 is a horizontal sectional view taken along line 5—5 of FIG. 4;

FIG. 6 is another horizontal sectional view along line 6—6 of FIG. 4;

FIG. 7 is a somewhat schematic, exemplary arrangement of an automotive engine to which are attached an air inlet filter and a gas outlet filter or purifier, both according to the invention;

FIG. 8 is again a view similar to FIGS. 1 and 4 of the air inlet purifier shown in FIG. 7;

FIG. 9 is a sectional view taken along line 9—9 of FIG. 8, illustrating the inlet end of the device;

FIG. 10 is a sectional view along line 10—10 of FIG. 8, across the dust-collecting end of the device;

FIG. 11 is a partial, sectional illustration of a closure member of FIG. 8, taken along line 11—11 of FIG. 10;

FIG. 12 is a view of the gas outlet purifier shown in FIG. 7;

FIG. 13 is an end view of the purifier shown in FIG. 12, at the gas inlet side, also showing the CO outlet;

FIG. 14 is a sectional view taken along line 14—14 of FIG. 12, illustrating the outlet end of the device;

FIG. 15 is a sectional view taken along line 15—15 of FIG. 12, showing the inlet end of the device from one side of a disc-shaped member; and FIG. 16 is a sectional view similar to that of FIG. 15, taken along line 16—16 of FIG. 12, at the other side of the disc-shaped member.

The first embodiment of the inventive air and gas purifying device is shown in FIGS. 1–3. It is shown in a vertical mounting position although horizontal operation is entirely feasible (as shown by the example of FIGS. 8–11). An inlet 11 is provided for the air or gas to be cleaned or purified; this is flattened toward one side, as seen in the sectional view of FIG. 2, and continues in a helical conduit 12 leading to a tubular inner space 13 of the device. Cylindrical walls 14 define therein a whirling chamber which has a length at least three times that of the diameter of walls 14.

A tubular outlet 15 is secured to the top of the device and depends about halfway into the chamber within the space 13. From the bottom of the device, an axial rod or member 16 extends toward and into the outlet tube 15; well within the latter, a spider-shaped centering member 17 is attached to member 16 so as to keep it in a concentric position with respect to outlet 15 and walls 14.

At the lower end of member 16, a disc- or cup-shaped member 18 is attached, below which the walls 14 have a lateral opening 19 which leads into a dust collector chamber 20 secured to wall 14 by conventional means. As a matter of example, a threaded post and a securing screw have been generally designated with numeral 21. As shown in FIGS. 1 and 3, opening 19 is arcuate and allows free passage of dust from below the disc member 18 across the entire width of chamber 20.

It will be noted from FIG. 1 that the cup-shaped member 18 has an upwardly directed flange 18a in closely adjacent relationship with the cylindrical walls 14. The opening 19 is between the lower edge of member 18 and the bottom plate of the device. The dust collector chamber 20 is removable for cleaning purposes; its size is dependent upon the quantity of impurities the device is supposed to handle between each cleaning. For purposes of cleaning or maintenance, the rod 16 may be removably attached to the bottom plate, as schematically shown at 22.

The operation of the first embodiment is as follows: air or gas to be purified enters at 11, whirls around the helical path of conduit 12, and eventually reaches inner space 13. From here on, the whirling movement, guided between walls 14 and outlet tube 15, is downward and concentric. The dust or other minute particles entrained by the air are allowed to drop, by their own weight, and are partly accumulated below the disc member 18. The gap between flange 18a and walls 14 is wide enough to allow the expected amount of impurities to pass without obstructing the passage. The continually whirling air column entrains the particles across the arcuate opening 19, and into the collecting chamber 20.

The whirling air, relieved of the entrained particles, ascends in a helically wound, upwardly directed movement along rod 16 and inside the tubular outlet 15, for being discharged at the top of the device, as illustrated. Directional arrows show the entry, the whirling and the exit of the air stream.

The second embodiment of the purifier appears in FIGS. 4–6. A similar set of reference numerals has been used for identical parts as those of the first embodiment. In this instance, an inlet 31 is arranged for the fluid to be cleaned, on the end of the device opposite an outlet 35. The inlet continues, in helical fashion, in the shape of a conduit which has sections 32a, 32b and 32c all along an inner space 33. From the innermost section 32c, an arcuate opening 43 leads to the top portion of space 33. Within walls 34, in which said opening 43 is provided, the outlet tube 35 is centrally located; however, it is shorter than tube 15 of the previous embodiment. Otherwise, elements 36–40 are substantially identical with the previously described respective counterparts 16–20; attachment 42 is similar to that shown at 22.

For the sake of simplicity, no securing means has been shown for the dust collecting chamber 40 (shown in FIG. 6 while it is hidden in FIG. 4 behind the lower portion of chamber 33). It should be noted that bottom plate 44 and top plate 45 may hold together the walls 34 as well as the surrounding helical wall sections forming the conduits 32a, 32b and 32c in a releasable manner, so that access may be had to the inner spaces, and to chamber 33 in particular, for cleaning purposes. Appropriate grooves and retaining profiles have been shown in plates 44, 45. The elements have not been described for FIGS. 1–3 but are, of course, also adaptable thereto, as shown in the drawings.

In operation, the fluid to be purified enters at 31 and ascends in a helical path until it reaches opening 43 from where on the concentric downward movement, in chamber 33, is similar to that described before. Owing to the provision of double the path as compared to the first embodiment, the outlet tube 35 may be shorter in this instance. In general it has been found best to use a tube (e.g. that shown in FIG. 1 at 15) which is half the length of the chamber around it (e.g. 13). In FIG. 4, sufficient rotational velocity has been imparted to the air or gas while moving along conduit 32 that the whirling action in chamber 13, and deposition of the entrained dust, will approximate 100%. By dust and impurities, the present application, of course, contemplates all minute elements (e.g. soot, pollen, chemical substances, residues of combustion processes, etc.) that may be contained in fluid media to be purified, particularly for vehicular purposes. The air discharged through the outlet 35 does not carry any noteworthy impurities.

In FIG. 7, an automotive internal combustion engine has been illustrated schematically, in broken lines; it is designated 1, an air intake manifold or tube being shown at 5 while an exhaust manifold is indicated at 7. To the former is linked an air inlet purifier, generally denoted 50, and shown in FIGS. 8–11, while the exhaust gases are treated by a gas outlet purifier, denoted 70, and shown in detail in FIGS. 12–16. Again, identical and correspondingly chosen reference numerals appear of which, however, some less important ones have been omitted.

The purifier 50 of FIGS. 8–11 is in many respects similar to that of the first embodiment (FIGS. 1–3). The atmospheric air inlet appears at 51; the purified air is led through outlet 55 to engine intake 5. In this case again, elements 52–54 and 56–60 are similar to the previously described counterparts 12–14 and 16–20, respectively. Additionally, a sleeve 66 is shown in FIGS. 9 and 10 for spacing apart the disc-shaped member 58 from the bottom of the device.

Instead of the securing means 21 shown in the first embodiment, device 50 has a clip-type fastener 61 shown in detail in FIG. 11. At the center of the cover for the dust collector 60 there are two eyes into which a U-shaped wire or clip is inserted (best visible in FIG. 10). The bottom of the collector cover has a wedge-shaped nose with a recess into which a central portion of the clip can be snapped in. When the cover is applied, the lateral clip ends are inserted into the eyes and the central portion urged into the recess of the nose on the cover. This provides a tight and secure attachment which is adapted to withstand the vibrations of vehicles and other moving machinery. The collector cover may have a foam rubber packing so as to avoid dust from leaving the collector along the edges.

It is seen that the embodiment of FIGS. 8–11, is shown to consist of a plastic substance, rather than of metal. The walls 54 of the device may be formed as a separate, cylindrical unit to which the dust collector 60 may be joined by way of a strap member 67, similarly made of plastic. The aforementioned eyes for the clip ends may be provided in this member, as shown in FIG. 10.

The operation is similar to that of the previous embodiments, with the only difference that not dust-laden but atmospheric air is filtered before it enters the engine air intake. The dust collector may, accordingly, be smaller in this instance.

Now we come to the purifier 70 of FIGS. 12–16 which is similar to the second embodiment (FIGS. 4–6). Again, the device has been shown in a horizontal arrangement, like purifier 50, although a vertical operation is also possible. The purifier 70 is fed by the exhaust gases leaving the manifold 7, owing to the connection of the latter to a lateral inlet 71; the cleaned gases are discharged into the atmosphere at the usual outlet tube 75, FIGS. 12, 14 and 16 show that a single-turn conduit 72 is provided around whirling chamber 73 proper. Here, again, the gases first pass along conduit 72, across an opening 83 provided in the chamber walls (much like opening 43 of the second embodiment), and finally along chamber 73, in a direction opposite to that along conduit 72, so as to emerge through tubular outlet 75. Elements 76, 78 and 84 are substantially identical with the previously described counterparts 36, 38 and 44, respectively. Additionally, the following different parts will be described.

This modified embodiment has a collector tube 80 for precipitated combustion products; the tube has substantially the same length as the whirling chamber 73. FIG. 15 shows an exemplary manner of attachment, by way of a strap member 87 which surrounds the chamber 73 somewhat like member 67 does in the previous embodiment. Owing to the separate collector tube 80, opening 79 is provided in an intercommunicating fashion between said tube 80 and the chamber 73 (unlike the previous counterparts 19 and 39).

Collector tube 80 has a removable cover 80a at one end, secured, as a matter of example, with a releasable clip means schematically shown at 81. Although the tube 80 is relatively long, its complete emptying and cleaning is easily accomplished since the cover 80a allows access to the entire inner lumen. The clip means 81 may be secured by way of small wing nuts, as shown in FIG. 12; also, this cover may be hinged on one side.

Owing to the horizontal mounting of the gas outlet purifier 70, as shown in FIG. 7, the accumulated particles and combustion products will tend to be shifted along the entire length of the tube 80 during the starting and stopping movements of the vehicle to which the purifier is attached. Consequently, the entire inner space of tube 80 will be exploited and there is no danger of clogging in the region of or underneath the opening 79.

It should be noted that all the purifying devices according to the invention are equally well suited for gasoline, for oil and for other types of engine fuels. For the former, there is less of a precipitation in the collector tube (e.g. tube 80) so that it can be made narrower and/or flat (not shown), if space limitations prevail. For diesel service, however, the full-length and large-diameter tube will be preferred so as to avoid all too-frequent cleaning jobs.

In the fourth embodiment shown in FIGS. 12–16, an auxiliary, small outlet 88 is applied to the bottom plate 84, as shown in FIGS. 12 and 13. From here, CO and other gaseous substances may be returned to the air intake 5 of the engine (see FIG. 7). A check valve (manual or remotely controlled) may be added to the conduit between outlet 88 and air inlet 5 (not illustrated) so as to allow the driver selectively to administer more or less hot gaseous substances, derived from the purifier 70, to the engine.

In all the devices described so far, the considerable length of the whirling chambers 13, 33, 53 and 73, in comparison to their diameter, insures that even the finest particles, which tend to float longer in the entraining fluid than heavier ones, are precipitated between the lower end of the inner tubes 15, 35, etc. and the flanged top of the disc-shaped members 18, 38, etc. before the cleaned air or gas is allowed to be discharged in the core of the whirling fluid (see the concentric arrows applied to FIG. 1). The proportion between length and diameter of the chambers is around 3:1. Preferably, the lengths of the chamber proper and the portion of the outlet tube protruding thereinto have a ratio of 2:1, except for the second and fourth embodiments where the helical conduit around the whirling chamber proper allows the inner portion of the tubular outlet to be shortened.

It will be understood by those skilled in the art that sealing rings may be used where necessary, although these have been omitted in the exemplary embodiments for purposes of simplification.

It should also be noted that the spider-shaped centering members (e.g. 17) have been shown as a possible example only and that equivalent expedients may also be used as long as they allow releasable centering of the axial rods with respect to the outlet tubes (e.g. 16, 15), coupled with free passage of the discharged air through the latter.

It is important that the introduced fluid to be purified enters in the form of a band-like stream, as can easily be visualized from FIGS. 1 and 2. The respective openings 43 and 83 of the second and fourth embodiments, of course, make for a similar band-like entry of the fluid from the outer conduits to the whirling chambers proper (e.g. from 32c into 33). Even at relatively low values of flow velocities, the downward whirling of the fluid along the inner walls of the whirling chamber will be separate from the upward flow of fluid, concentrically with but inside the peripheral flow—the directions being as viewed in FIG. 1 or 4.

Extensive experiments and tests have been conducted with models of the vortex cyclone type purifiers of the invention. Some of the results are as follows:

The purifier as shown in FIGS. 12–16 has been installed to the exhaust end in a diesel truck (Robur Diesel model 1961, stroke 3181 cc., four cylinders, useful load 1950 kg.). The truck was used for city deliveries; the purifier was sealed for the period of the test and the results taken by non-profitmaking scientific laboratories. During the first 404 kilometers, 1075 grams of a black, oily, highly viscous to particulate and granular matter has been removed which exhibited tar-like smell.

Microscopic examination of the dried precipitate, with 950× magnification, with an ocular micrometer, yielded diameters of the 25 smallest particles between 0.6 and 1.2$\mu$ (10$^{-3}$ cm. values: 0.06 to 0.12). The larger particles have been found to consist of several smaller particles.

The above results prove the efficiency of the inventive device beyond doubt.

I claim:

1. A vortex type fluid purifying device comprising a substantially cylindrical elongated housing having opposed end walls, a fluid tangential inlet opening near a first end of said housing, a fluid outlet including a tubular member of smaller diameter and length than said housing and protruding coaxially through the end wall at said first end and extending beyond the fluid inlet, a disc member disposed near the other end of said housing, said disc member comprising a flat disc-shaped portion and an annular flange extending away from said disc-shaped portion and toward said first end of said housing, a rod-shaped member coaxially located within said housing, said rod-shaped member supporting the disc member and extending upwardly into the tubular member, and an outlet for particles, said outlet being in the wall of the housing at a point between the face of the disc-shaped member facing away from the first end of the chamber and the other end of the chamber.

2. A fluid purifying device according to claim 1, in which the length of the housing is at least threefold the diameter of the housing.

3. A fluid purifying device according to claim 1, in which said fluid inlet includes at least one full turn of a helical conduit opening into said housing.

4. A fluid purifying device according to claim 3, in which the axial dimension of said helical conduit is almost coextensive with the axial dimension of said housing and the inlet of said helical conduit is adjacent the end of said housing opposite the first mentioned end.

5. A fluid purifying device according to claim 1, in which said annular flange and said housing are coaxial and said annular flange and the inner cylindrical periphery of said housing are radially spaced from each other.

6. A fluid purifying device according to claim 1, further comprising a particle collector housing connected to said particle outlet.

References Cited

UNITED STATES PATENTS

| | | |
|---|---|---|
| 405,869 | 6/1889 | Bretney. |
| 1,744,708 | 1/1930 | Kamrath. |
| 1,791,732 | 2/1931 | Manchester. |
| 1,946,015 | 2/1934 | Carnahan. |
| 2,194,361 | 3/1940 | Linder. |
| 2,346,005 | 4/1944 | Bryson. |
| 2,367,906 | 1/1945 | Wall et al. |
| 2,448,420 | 8/1948 | Davidson. |
| 2,643,733 | 6/1953 | Shellman. |
| 2,672,871 | 3/1954 | Slovic. |
| 2,906,404 | 6/1954 | Orelli et al. |
| 2,942,687 | 6/1960 | Kollander. |
| 2,981,369 | 4/1961 | Yellott et al. |
| 2,998,100 | 8/1961 | Pike. |
| 3,004,627 | 10/1961 | Wehn. |
| 3,019,780 | 2/1962 | Nuding. |
| 3,031,825 | 5/1962 | Fourniere. |
| 3,189,460 | 6/1965 | Smith. |
| 3,232,430 | 2/1966 | Saint Jacques. |
| 424,013 | 3/1890 | Mellin _____ 55—456 |
| 2,323,708 | 7/1943 | Danz _____ 55—346 |
| 2,751,043 | 6/1956 | Ruth et al. _____ 55—458 |

FOREIGN PATENTS

| | | |
|---|---|---|
| 1,281,666 | 12/1961 | France. |
| 849,350 | 9/1952 | Germany. |
| 641,357 | 8/1950 | Great Britain. |
| 726,616 | 3/1955 | Great Britain. |
| 176,353 | 6/1935 | Switzerland. |

FRANK W. LUTTER, *Primary Examiner.*

BERNARD NOZICK, *Assistant Examiner.*

U.S. Cl. X.R.

209—144; 60—29